Aug. 25, 1931. V. N. BOGDANOV 1,820,213
AUTOMATIC COUPLING
Filed Nov. 18, 1929    2 Sheets-Sheet 1

VLADIMIR N. BOGDANOV
INVENTOR
BY John P. Nixonow
ATTORNEY

Aug. 25, 1931. V. N. BOGDANOV 1,820,213
AUTOMATIC COUPLING
Filed Nov. 18, 1929 2 Sheets-Sheet 2
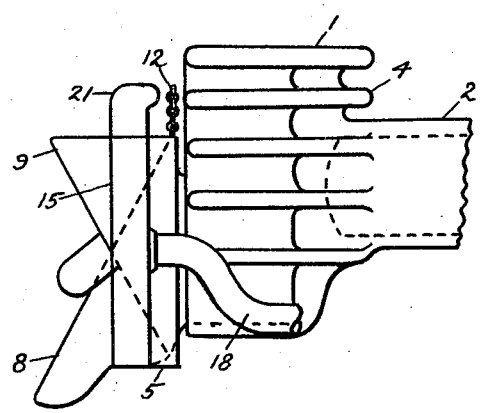
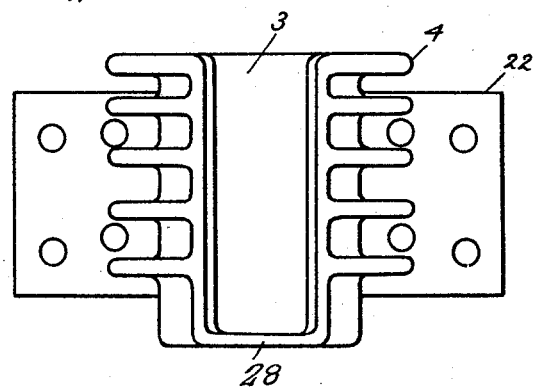
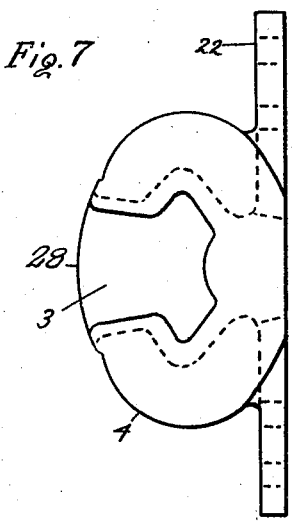
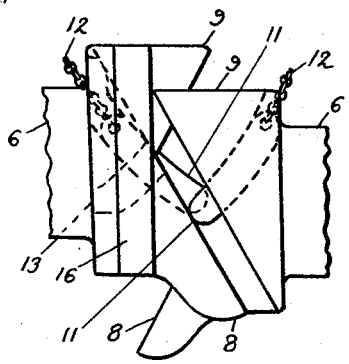
VLADIMIR N. BOGDANOV
INVENTOR
BY John P. Nironow
ATTORNEY Patented Aug. 25, 1931

1,820,213

UNITED STATES PATENT OFFICE

VLADIMIR NICOLAIEVITCH BOGDANOV, OF MOSCOW, UNION OF SOCIALIST SOVIET REPUBLICS

AUTOMATIC COUPLING

Application filed November 18, 1929. Serial No. 408,011.

My invention relates to automatic couplings and has a particular reference to couplings adapted to connect railroad cars and similar vehicles which are connected into trains.

The object of my invention is to provide a simple and effective coupling which enables the cars to be positively coupled when they are brought together. My coupling also has a provision for automatically connecting air, steam and other pipes between the cars.

My invention is more fully described in the accompanying specification and drawings in which—

Figure 1:
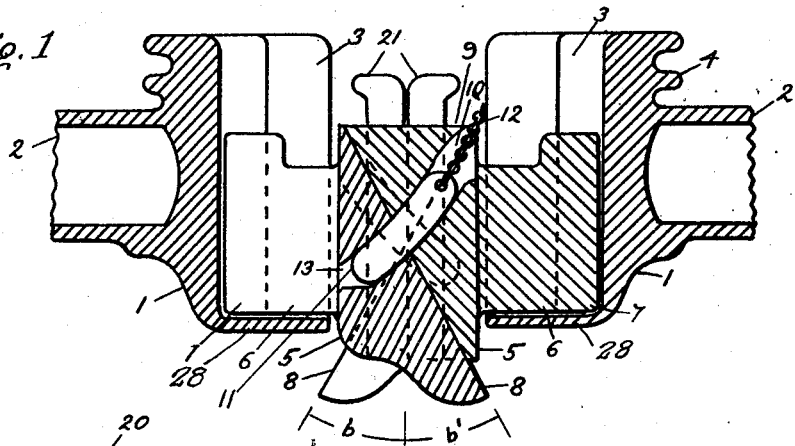
Figure 2:
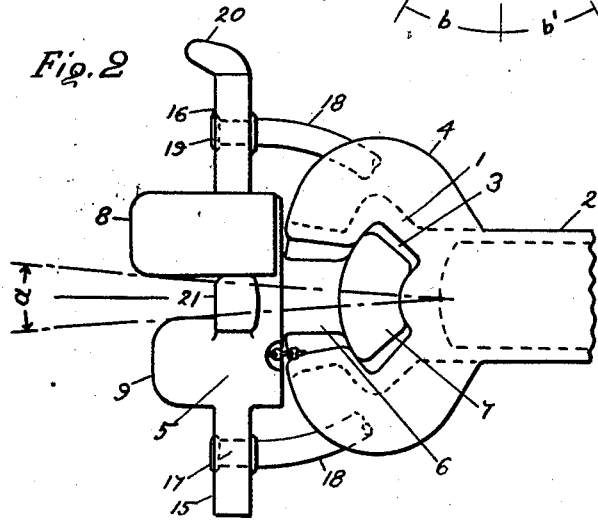
Figure 4:
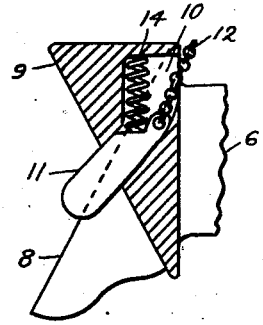
Figure 3:
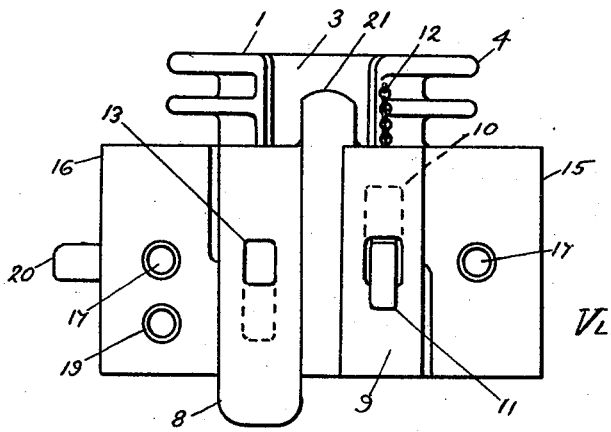

Fig. 1 is a sectional side elevation of two couplings connected together, Fig. 2 is a top view of my coupling, Fig. 3 is a front view of same, Fig. 4 is a partial sectional view showing a modified arrangement of a locking pin, Fig. 5 is a side view of my coupling, Fig. 6 is a front view of a modified construction of the coupling head, Fig. 7 is a top view of same, and Fig. 8 is a partial sectional view of two couplings being coupled together.

My coupling consists of a head 1 with a hollow tail 2 adapted to be mounted on the end of a drawbar. The front end of the head has a dovetail slot 3 and is provided with side ribs 4 which reenforce the head against lateral stresses.

A coupling block 5 has a tail 6 with an enlarged portion 7 adapted to fit the dovetail slot 3. The front and rear surfaces of the slot are shaped on concentric arcs of circles. The enlarged portion 7 is shaped to slidably fit between these surfaces, so that the coupling block can swing between the front and rear arcs of the dovetail slot through an angle "a" (Fig. 2), the tail 6 being narrower than the slot 3. This arrangement permits the couplings to swing in a horizontal plane when going over the curves, with the coupling blocks rigidly connected together.

The front portion of the coupling block has two lugs 8 and 9 the front surfaces of which are finished flat and form angles "b" and "b'" with the vertical line, these angles being equal but arranged in opposite directions, that is on both sides of the vertical plane.

The lugs 9 have holes 10 in which locking pins 11 are slidably fitted being suspended on chains 12. These chains are suspended on levers extending to the side or to the top of the car with handles for uncoupling the coupling between two cars.

The lower lugs 8 have also holes 13 registering with the holes 10 when the surfaces of the lugs 8 and 9 are pressed against corresponding surfaces of another coupling. In this position of the couplings the locking pins 11 can slide from their holes 10 partly into the holes 13 as shown in Fig. 1. Springs 14 (Fig. 4) may be provided in order to force the pins 11 into the holes 13.

Plates 15 and 16 form extensions at the sides of the lugs 8 and 9 and are provided with apertures 17 for flexible pipes 18. Rubber rings or bushings 19 are provided at the front of these apertures. These rings press against corresponding rings of another coupling thereby forming leak-proof joints for the pipes 18. These pipes may be used for conducting water, steam, or for enclosing electric cables.

Lugs 20 are provided on the plates 16 with angular front surfaces in order to force the plates 15 and 16 into a lateral alignment.

Vertical lugs 21 are also provided in order to enable the coupling to be connected with a car which has only hooks on chains for this purpose, the hook engaging in this case the lug 21.

A modified arrangement is shown in Figs. 6 and 7 with a rear flange 22 for attaching the head to the front edge of a car when it is not provided with a drawbar.

The operation of my coupling is as follows.

The uncoupling handles and levers (not shown) are released allowing the pins 11 to extend half way out of the holes 10 on chains 12.

The inclined or angular surfaces 8 and 9 of the opposing couplings meet when the cars are brought together. If one car or coupling is higher than the other, then these surfaces will force the coupling blocks into alignment (Fig. 8) by forcing one of the coupling blocks up in the slot 3. At the same time any misalignment in the lateral direction will be corrected by the lugs 20, which will cause the coupling blocks to rotate in the slots 3 until the flat surfaces 15 and 16 meet squarely each other. Such alignment can also take place if the cars are being coupled on a curve, if the clearances in the slots 3 are made sufficiently large to permit rotation of the coupling blocks for a corresponding angle "a" determined by the shortest radius of the track curve.

When the couplings are fully aligned, the holes 13 register with the holes 10, and the locking pins 11 slide into the holes 13, as shown in Fig. 1, under action of their weight or pushed by springs 14. The pins 11, being inclined in opposite directions, effectively lock together two couplings. The plates 15 and 16 of the opposing couplings are brought against each other thereby also connecting together pipes 18. The rubber rings or gaskets 19 will seal the joints against leakages. Valves of an ordinary construction can be provided in the holes 19 in order to prevent leakage when the cars are uncoupled.

The coupling blocks of two cars, being tightly joined together as shown in Fig. 1, allow at the same time a considerable degree of freedom of relative movements to the respective cars: the coupling blocks can slide up and down in the slots 3 if the cars move vertically in relation to each other, and they can rotate in these slots to allow angular displacements of cars on the curves. The blocks 6 and 7 are prevented from falling out of the slots 3 by shelves or bridges 28 at the bottom of the heads 1.

Important advantages of my coupling are that it is entirely automatic in its action, self-aligning, simultaneously connects all the pipes in the cars permits relative displacement of coupled cars, and is reliable and simple in construction.

I claim as my invention:

1. In an automatic coupling, the combination with a head adapted to be attached to a vehicle and provided with a vertical dove-tailed slot closed at its lower end, of a coupling block, the rear end of said block being provided with an enlarged portion adapted to fit said slot, said block with said enlarged portion being adapted to slide vertically in said slot and to rotatively oscillate in a horizontal plane, a plurality of inclined surfaces at the front end of said block adapted to engage corresponding inclined surfaces of a corresponding block on another vehicle thereby aligning said block in a vertical plane, said front end of said block being provided with apertures passing through said inclined surfaces, locking pins slidably fitted in said apertures and adapted to join said respective coupling blocks together, and means to align said coupling blocks in a horizontal plane.

2. In an automatic coupling, the combination with a head adapted to be attached to a vehicle and provided with a vertical dove-tailed slot closed at its lower end, of a coupling block slidably fitted in said slot, an enlarged portion on said block adapted to fit said dove-tailed expansion in said slot, said slot and said block with its enlarged portion being so proportioned as to allow said block to rotate in a horizontal plane within predetermined limits, means to align respective blocks in a vertical plane, means to align said blocks in a horizontal plane, and means to automatically lock together said respective blocks.

3. In an automatic coupling, the combination with a head adapted to be attached to a vehicle and provided with a vertical dove-tailed slot closed at its lower end, of a coupling block, the rear portion of said block being shaped so as to fit said slot and to slide vertically in said slot, said rear portion being narrower than said slot, said block with said rear portion being adapted to swing laterally in said slot, inclined surfaces at the front end of said block adapted to engage the respective inclined surfaces of another corresponding block thereby aligning said blocks in a vertical direction, means to lock together the respective blocks of two couplings, means to support ends of pipes in said blocks, and means to connect the corresponding pipes together when two respective blocks are coupled together.

4. In an automatic coupling, the combination with a head adapted to be attached to a vehicle and provided with a vertical dove-tailed slot closed at its lower end, a coupling head slidably fitted in said dove-tailed slot and adapted to rotatively swing in said slot in a horizontal plane within predetermined limits, lugs with inclined surfaces at the front end of said block, said surfaces being adapted to fit respective surfaces of another corresponding block thereby causing alignment of said blocks in a vertical plane, means to align said blocks in a horizontal plane, said lugs being provided with inclined apertures, locking pins slidably fitted in said apertures, the aperture of one lug registering with corresponding aperture of a respective lug in another coupling when said couplings are in an alignment, said locking pins being adapted to partly slide into the apertures of corresponding lugs of another coupling thereby locking the two couplings together, said pins being adapted to be manually withdrawn from said apertures when it is desired to disconnect said couplings, means to support ends of pipes in said blocks, and means to automatically connect together said pipe ends when said blocks are coupled together.

5. In an automatic coupling, the combination with a head adapted to be attached to a vehicle and provided with a vertical dovetailed slot closed at its lower end, of a block slidably fitted in said slot and adapted to swing laterally in said slot within certain limits, lugs at the front end of said block to the right and to the left of its axis, the front surfaces of said lugs forming equal and symmetrical angles with the vertical plane, said lugs being provided with inclined apertures, aperture of one lug registering with a corresponding aperture of a respective lug of another coupling when said couplings are brought together, and locking members slidably fitted in said apertures and adapted to engage together said blocks of two corresponding couplings when said couplings are brought together.

6. In an automatic coupling, the combination with a head adapted to be attached to a vehicle, of a coupling block movably connected with said head, lugs in front of said block with inclined surfaces adapted to engage the corresponding inclined surfaces of another respective coupling head when said couplings are brought together, said lugs being provided with inclined apertures, aperture of one lug being adapted to register with the aperture of another respective lug of another coupling when said couplings are brought together, and sliding members in said apertures adapted to lock said blocks together when two respective couplings are brought together, said members being adapted to be manually withdrawn for disconnecting said couplings.

7. In an automatic coupling, the combination with a head adapted to be attached to a vehicle, of a coupling block slidably fitted in a slot in said head, said slot being closed at the bottom lugs in front of said block with inclined surfaces adapted to engage the corresponding surfaces of another coupling and provided with inclined apertures, sliding members in said apertures adapted to lock respective blocks of two couplings together, said surfaces being adapted to align said respective blocks in a vertical plane, means to align said blocks in a horizontal plane, and hooks on said blocks adapted to be engaged by chain type couplings.

Signed at Berlin, in the county of Brandenburg and State of Prussia this 8th day of October, A. D. 1929.

VLADIMIR NICOLAIEVITCH BOGDANOV.